United States Patent
Urakami et al.

(10) Patent No.: US 9,028,234 B2
(45) Date of Patent: May 12, 2015

(54) PRESSURE VESSEL

(75) Inventors: Yoshihito Urakami, Tokyo (JP); Yoshikazu Nishihara, Tokyo (JP); Hiroki Tatemi, Tokyo (JP); Takashi Moribe, Tokyo (JP)

(73) Assignee: Mitsubishi Heavy Industries Machinery Technology Corporation, Hiroshima-shi (JP)

( * ) Notice: Subject to any disclaimer, the term of this patent is extended or adjusted under 35 U.S.C. 154(b) by 0 days.

(21) Appl. No.: 13/699,990

(22) PCT Filed: May 9, 2011

(86) PCT No.: PCT/JP2011/060670
§ 371 (c)(1),
(2), (4) Date: Nov. 26, 2012

(87) PCT Pub. No.: WO2012/114540
PCT Pub. Date: Aug. 30, 2012

(65) Prior Publication Data
US 2013/0337097 A1  Dec. 19, 2013

(30) Foreign Application Priority Data
Feb. 25, 2011  (JP) ................................ 2011-040723

(51) Int. Cl.
*B29D 30/06*  (2006.01)
*F16J 12/00*  (2006.01)
(Continued)

(52) U.S. Cl.
CPC .............. *B29D 30/0601* (2013.01); *F16J 12/00* (2013.01); *B29D 30/065* (2013.01);
(Continued)

(58) Field of Classification Search
CPC .... B29D 30/0601; B29D 30/065; F16J 12/00; B29C 35/0227
USPC .................................................. 425/34.3, 472
See application file for complete search history.

(56) References Cited

U.S. PATENT DOCUMENTS
3,917,440 A * 11/1975 Huebert ....................... 425/34.3

FOREIGN PATENT DOCUMENTS
CN    201554848 U    8/2010
JP    H01-29050 Y2    9/1989
(Continued)

OTHER PUBLICATIONS
PCT, "International Search Report and Written Opinion for PCT/JP2011/060670", Jun. 7, 2011.
(Continued)

*Primary Examiner* — James Mackey
(74) *Attorney, Agent, or Firm* — Benjamin Hauptman; Manabu Kanesaka; Kenneth Berner

(57) ABSTRACT

Provided is a pressure vessel having a weld portion structure of a plate material in which a plate receiving a pressure or a load is attached by welding to a wall surface member such as a shell or a head. In the pressure vessel, a stress concentration on the weld portion structure is alleviated and an increase in welding amount and plate thickness of the wall surface member are suppressed. The pressure vessel includes a weld structure portion in which an end of a bolster plate (22) attached so as to partition an inside of a container body and receiving a pressure or a load is attached by welding to a wall surface member (30) of the container body, the weld structure portion having at least two sections including a weld portion (40), i.e., shape displacement points of the weld portion (40) and a stepped portion (50).

4 Claims, 6 Drawing Sheets

(51) Int. Cl.
*B23K 31/00* (2006.01)
*B23K 31/12* (2006.01)
*B23K 33/00* (2006.01)
*B29C 35/02* (2006.01)

(52) U.S. Cl.
CPC ............ *B23K 31/003* (2013.01); *B23K 31/125* (2013.01); *B23K 33/006* (2013.01); *B23K 2201/12* (2013.01); *B29C 35/0227* (2013.01)

(56) References Cited

FOREIGN PATENT DOCUMENTS

| JP | H10-034328 A | 2/1998 |
| JP | 2005-088048 A | 4/2005 |
| JP | 2008-221300 A | 9/2008 |

OTHER PUBLICATIONS

China Patent Office, "Office Action for CN 201180023043.6," Jun. 3, 2014.
Japan Patent Office, "Decision to Grant a Patent for JP 2011-040723," Aug. 26, 2014.
Korea Patent Office, "Notice of Allowance for KR 10-2012-7028594," Sep. 5, 2014.
Taiwan Patent Office, "Notice of Allowance for TW 101102863," Sep. 19, 2014.

\* cited by examiner

STRESS RATIO = $\delta / \delta_\mu$ $\delta_\mu$: STRESS PEAK VALUE OF CONVENTIONAL STRUCTURE
$\delta$ : STRESS PEAK VALUE OF STRUCTURE OF PRESENT APPLICATION

PRESSURE VESSEL

RELATED APPLICATIONS

The present application is National Phase of International Application No. PCT/JP2011/060670 filed May 9, 2011, and claims priority from, Japanese Application no. 2011-040723, filed Feb. 25, 2011.

TECHNICAL FIELD

The present invention relates to a pressure vessel used for a tire machinery, for example, and more particularly, to a weld portion structure of a plate material, such as a bolster plate or a bottom plate, which is welded to a shell or a head within a container.

BACKGROUND ART

Heretofore, pressure vessels that receive a pressure higher than an atmospheric pressure have been widely used inside containers formed by welding heads to the top and bottom of a shell. Examples of such pressure vessels include a structure in which an end of a plate material is welded and attached to a wall surface member of a shell or a head, such as a bolster plate which is attached so as to partition the inside of a container body and receives a pressure.

FIG. 9 is a sectional view illustrating a conventional structure of a weld structure portion in which a bolster plate is attached by welding to a wall surface member of a pressure vessel. In this weld structure, an end of a plate material 1 is welded to a wall surface member 2 with a weld portion 3 so that a substantially T-shaped sectional surface is formed.

Such a weld portion 3 is subjected to machining so as to obtain an exposed surface 4 that forms a tapered shape, an R-shape, or the like to alleviate a stress concentration on the weld portion.

Note that Patent Literature 1 described below, for example, discloses a technique in which the weld portion 3 described above is subjected to machining into an R-shape.

CITATION LIST

Patent Literature

{PTL 1}
Japanese Examined Utility Model Application, Publication No. Hei01-29050 (see FIG. 3 etc.)

SUMMARY OF INVENTION

Technical Problem

Incidentally, the alleviation of the stress concentration on the weld portion 3 as described above allows the exposed surface 4, which is extended by increasing the length of the tapered surface of the weld portion or increasing the radius of the R-shape, to be effective. However, the extension of the exposed surface 4 having an elongated tapered surface and an R-shape with a large radius requires to increase the welding amount of the weld portion 3, which results in an increased in the heat input amount due to welding.

On the other hand, the heat input amount of welding is limited by a plate thickness "t" of the wall surface member 2 to be welded with the plate material 1. Accordingly, when the stress concentration is to be alleviated by the tapered surface or the R-shape as described above, problems of an increase in the welding amount as well as an increase in the plate thickness "t" of the wall surface member 2 arise.

The present invention has been made in view of the above-mentioned circumstances, and it is an object of the present invention to provide a pressure vessel including a weld portion structure of a plate material in which a plate material receiving a pressure or a load is attached by welding to a wall surface member such as a shell or a head, in which an increase in the welding amount and the plate thickness of the wall surface member is reduced or suppressed to alleviate a stress concentration.

Solution to Problem

The present invention employs the following means to solve the above-mentioned problems.

A pressure vessel according to the present invention includes a weld structure portion in which an end of a member attached so as to partition an inside of a container body and receiving a pressure or a load is attached by welding to a wall surface member of the container body, the weld structure portion having at least two shape displacement points including the weld portion.

According to the pressure vessel described above, the weld structure portion has at least two shape displacement points including the weld portion, thereby making it possible to reduce a stress peak value of a weld structure portion by dispersing the stress concentration portion. In this case, a stepped portion formed into a tapered shape, an R-shape, or the like is provided to the wall surface member, for example, as a preferable shape displacement point.

The pressure vessel of the present invention as described above is desirably used for a tire machinery that cures a tire within a container, for example.

Advantageous Effects of Invention

According to the present invention described above, the weld structure portion has at least two shape displacement points including the weld portion, which allows the stress concentration portion to be distributed into a plurality of sections. This makes it possible to reduce the stress peak value acting on the weld structure portion of the pressure vessel and improve the machine life of the pressure vessel.

In other words, the weld structure portion can prevent the use of alleviation of the stress concentration of the weld portion by the extension of a tapered shape, an R-shape, or the like, which increases the welding amount of the weld portion, thereby enabling reduction in welding cost and welding distortion. Furthermore, a shell or a head serving as the wall surface member is not increased in the welding amount, which causes no increase in the plate thickness due to the limitation of the heat input amount. This enables reduction in material cost, canning cost, and shipping cost.

DESCRIPTION OF EMBODIMENTS

Hereinafter, an embodiment of a pressure vessel according to the present invention will be described with reference to the drawings.

Figure 3:
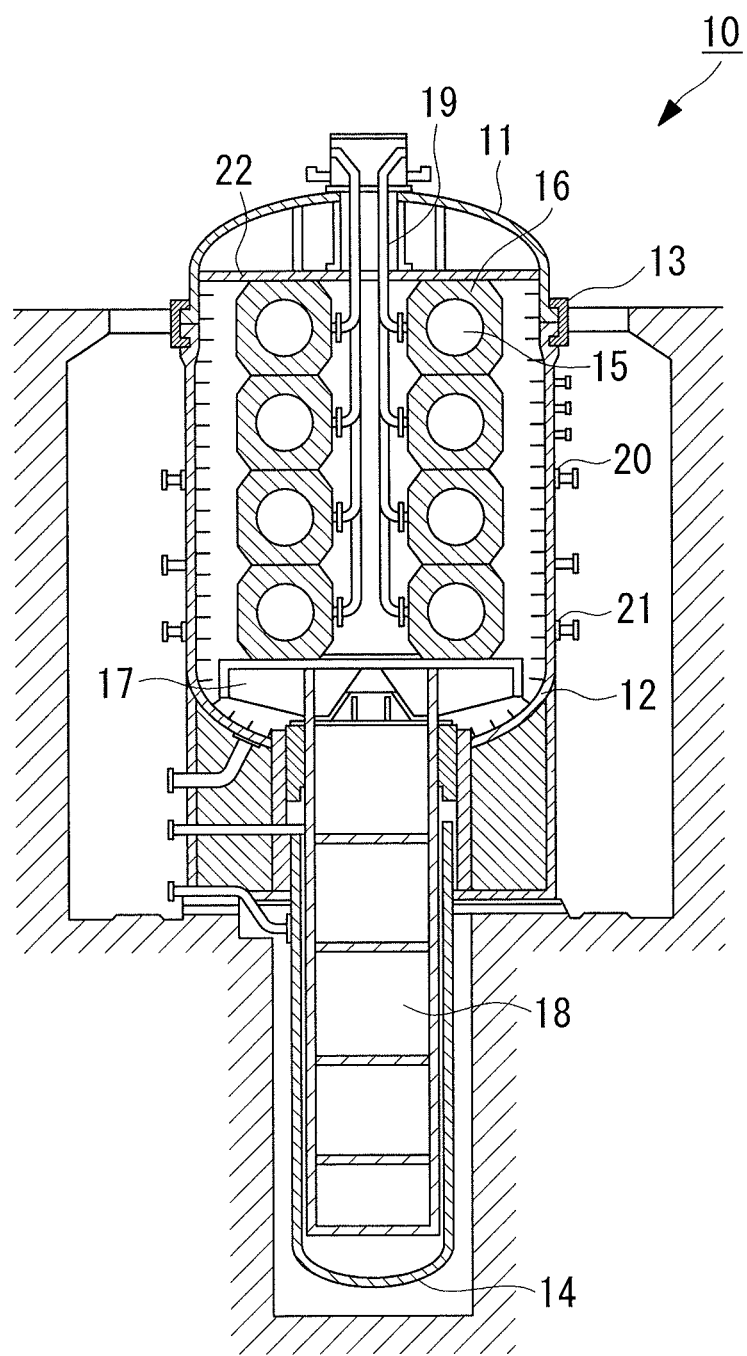
FIG. 3 is a sectional view illustrating a structural example of a tire machinery as an example of application of the pressure vessel according to the present invention.

Now, FIG. 3 illustrates a structure example of a tire machinery (tire curing apparatus) as an example of application of the pressure vessel according to the present invention. A tire machinery 10 illustrated in the figure is an apparatus called an autoclave (or a hot heater) used for curing of tires for heavy duty vehicles such as construction machines. This tire machinery 10 is a pressure vessel manufactured based on Class-1 pressure vessel structure standards in Japan.

In the tire machinery 10, the pressure vessel used for curing of tires has a structure in which an upper dome 11 and a lower dome 12 are detachably/attachably connected through clamp rings 13 so as to block an external air, thereby supporting a load due to a fluid pressure (air, hydraulic pressure, oil pressure, or the like) within a cylinder 14 and a load due to a vapor pressure within the lower dome 12.

Molds 16 each accommodating a green tire 15 to be cured are stacked in three to four stages on a mold table 17. Note that reference numeral 18 denotes a ram that transmits a pressing force; 19, a flexible hose that supplies hot water and cooling water to each green tire 15; 20 and 21, nozzles that eject hot water and cooling water, which are supplied through the flexible hose 19, to each green tire 15 to be cooled.

The upper dome 11 described above is obtained by welding a head to an upper portion of a cylindrical shell. This upper dome 11 is mounted with a bolster plate 22 of a plate member so as to partition the inside of the pressure vessel, which is formed with the lower dome 12 and the clamp rings 13, into upper and lower portions.

As illustrated in FIG. 1, for example, this bolster plate 22 has an end attached by welding to a wall surface member 30 forming a cylinder upper portion of the container body so as to obtain a substantially T-shaped sectional surface. In the following description, a weld portion at which the bolster plate 22 is welded to the wall surface member 30 is referred to as a weld portion 40.

Accordingly, a pressure within the pressure vessel and a load of the cylinder 14 act on the bolster plate 22 of the tire machinery 10 described above. The wall surface member 30 of this case is a cylindrical shell forming the upper dome 11, or a cylinder portion of a head welded to this shell.

The pressure vessel of this embodiment includes a weld structure portion which is illustrated in the figure and in which an end of the bolster plate 22 attached so as to partition the inside of the container body and receiving a pressure or a load is attached to the well surface member 30 of the container body with the weld portion 40. This weld structure portion has at least two shape displacement points including the weld portion 40.

Figure 1A:
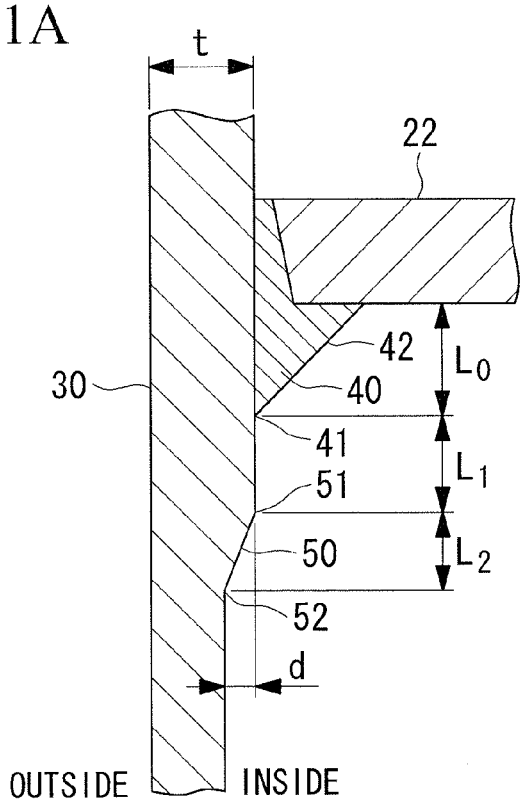
FIG. 1A is a sectional view illustrating an embodiment of a pressure vessel according to the present invention, and also illustrating a weld structure portion of a final state in which a bolster plate is attached by welding to a wall surface member of the pressure vessel to provide a stepped portion.

In the weld structure portion of the embodiment illustrated in FIG. 1A, the weld portion 40 as well as a stepped portion 50 is provided as a shape displacement point. This stepped portion 50 is a tapered surface generated by reducing (thinning) the plate thickness "t" of the wall surface member 30 by a thickness "d" by machining or the like.

Figure 1B:
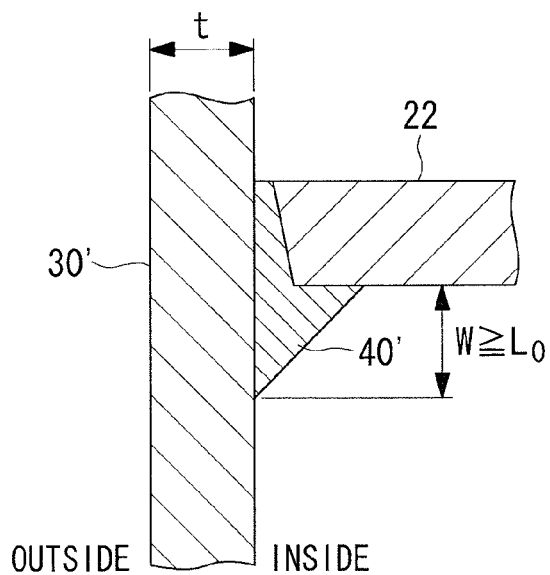
FIG. 1B is a sectional view illustrating an embodiment of the pressure vessel according to the present invention, and also illustrating the weld structure portion in a state after welding and before machining.

FIG. 1A illustrates the final shape obtained after the machining from a weld portion 40' in the state after welding illustrated in FIG. 1B. Specifically, the weld portion 40' obtained after welding has a welding leg length "W". From this state, the weld portion 40' is subjected to machining into the final shape of the weld portion 40. Further, the stepped portion 50 at a plate thickness displacement point which is obtained by thinning the plate thickness "t" by the thickness "d" by machining is formed below the weld portion 40. Note that the weld portion 40 of this embodiment is subjected to machining so that an exposed surface 42 forms a tapered surface.

The stepped portion 50 is formed, assuming that a distance from the lower surface of the bolster plate 22 to a welding toe 41 is $L_0$; a distance from the welding toe 41 to a shape change start point 51 at which the stepped portion 50 is started is $L_1$; and a shaving length (tapered shape growth) from the shape change start point 51 to a shape change end point 52 is $L_2$, in the weld portion 40 obtained after machining.

Here, assuming that a welding leg length obtained after welding, i.e., a welding leg length obtained before machining, is W, $L_0$, $L_1$, $L_2$, and d are set to satisfy $0 \leq L_0 \leq W$, $0 \leq L_1 \leq 5L_0$, $0 \leq L_2 \leq 9L_0 - L_1$, and $0 \leq d \leq 0.8t$. Note that the weld portion 40' need not be necessarily subjected to machining. Accordingly, the welding leg length W illustrated in FIG. 1B may be equal to or greater than the distance $L_0$ from the lower surface of the bolster plate 22 to the welding toe 41 ($W \geq L_0$).

In this manner, the weld structure portion of this embodiment, which is obtained by welding the bolster plate 22 to the wall surface member 30, has two shape displacement points such as the weld portion 40 and the stepped portion 50. Accordingly, in the weld structure portion receiving an input of a pressure or the like acting in the pressure vessel, the position receiving the stress concentration is distributed into two sections, thereby reducing a stress peak value. Specifically, the shape displacement points of the weld structure portion are provided on the weld portion 40 and the stepped portion 50, and the rigidity of the weld structure portion is reduced and the stress peak value is also reduced.

Figure 2:
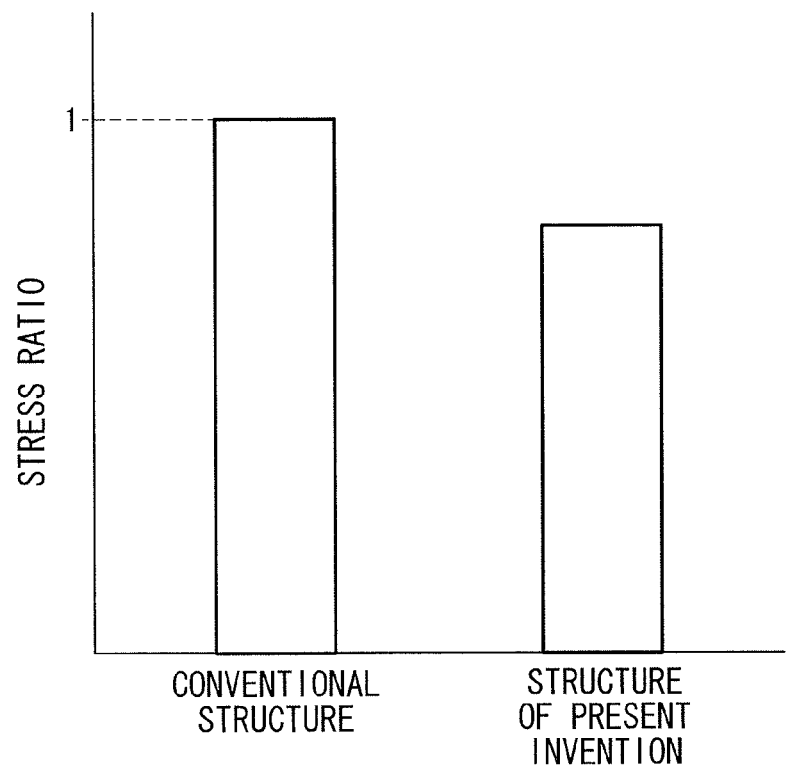
FIG. 2 is a graph illustrating a stress ratio with respect to a stress peak value of the weld structure portion illustrated in FIG. 1A, in comparison with a conventional structure illustrated in FIG. 9.
Figure 9:
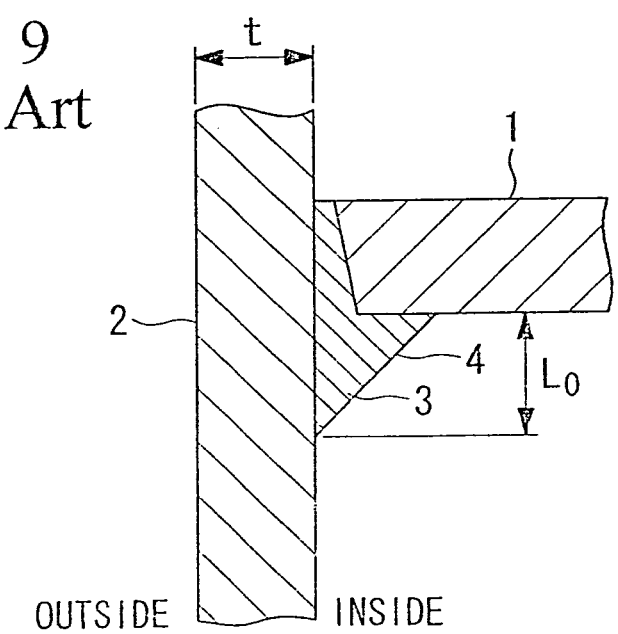
FIG. 9 is a sectional view illustrating a weld structure portion in which a bolster plate is attached by welding to a wall surface member of a pressure vessel, as a prior art pressure vessel.

FIG. 2 illustrates calculation predicted values of stress peak values compared between the structure of the present invention illustrated in FIG. 1A and the conventional structure illustrated in FIG. 9, under the same conditions except for the presence or absence of the stepped portion 50. Specifically, in the weld structure portion of the structure described above, assuming that a stress peak value δμ of the conventional structure is set as a reference value 1, it is apparent that a stress peak value δ of the structure of the present invention in which the stepped portion 50 is provided is reduced to be equal to or smaller than 1.

As a result, the pressure vessel having the weld structure portion of this embodiment has an excellent durability and reliability due to an improvement in machine lifetime.

Since the weld structure portion of this embodiment is additionally provided with the stepped portion 50, the same welding amount of the weld portion 40 as that of the conventional structure may be used. This avoids an increase in the welding amount, thereby enabling reduction in welding cost and welding distortion. Furthermore, an increase in the welding amount can be avoided in a shell or a head serving as the wall surface member 30. This also avoids an increase in the plate thickness due to the limitation of the heat input amount, thereby enabling reduction in the material cost, canning cost, and shipping cost.

Each shape displacement point of the embodiment embodiment (FIG. 1A) described above has a shape obtained by reducing the plate thickness "t" of the wall surface member 30 by the thickness "d" to form the stepped portion 50 of the tapered surface leading from the shape change start point 51 to the shape change end point 52. However, the shape is not limited thereto, as with the shape of the exposed surface 42 of the weld portion 40 having a tapered surface.

Figure 4:
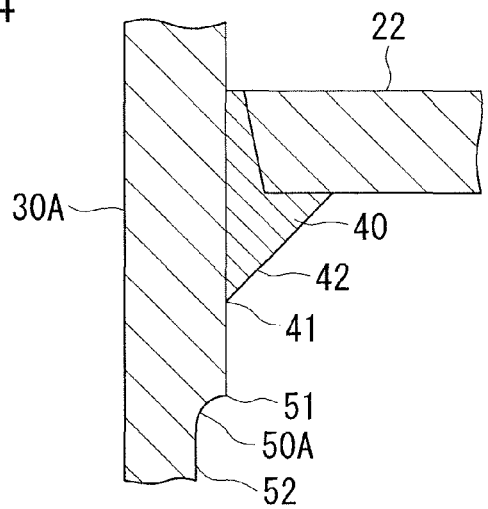
FIG. 4 is a sectional view illustrating a first modified example of the weld structure portion illustrated in FIG. 1A.

In a first modified example of the weld structure portion illustrated in FIG. 4, the plate thickness of a wall surface member 30A is reduced to form a stepped portion 50A having an R-shape leading from the shape change start point 51 to the shape change end point 52. Also in the case of providing the stepped portion 50A, the exposed surface 42 as described above can obtain the same operation and effect as those of the stepped portion 50 having a tapered surface.

Figure 5:
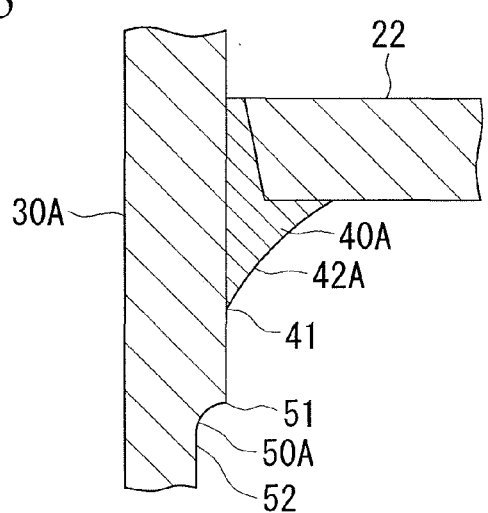
FIG. 5 is a sectional view illustrating a second modified example of the weld structure portion illustrated in FIG. 1A.

In a second modified example of the weld structure portion illustrated in FIG. 5, the exposed surface 42 of the weld portion 40 having a tapered surface in the embodiment and the first modified example described above is changed into a weld portion 40A having an exposed surface 42A having an R-shape, and the same operation and effect as those of the embodiment described above can be obtained. In this case, the stepped portion 50 in which the R-shape is changed into the tapered surface may be employed as the stepped portion 50A.

Figure 6:
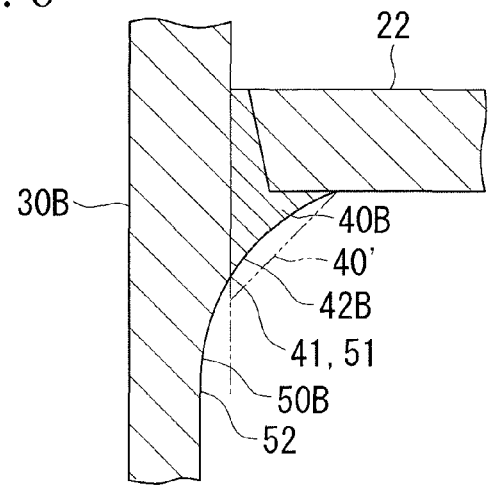
FIG. 6 is a sectional view illustrating a third modified example of the weld structure portion illustrated in FIG. 1A.

In a third modified example illustrated in FIG. 6, the distance $L_1$ from the welding toe 41 to the shape change start point 51 at which the stepped portion 50 illustrated in FIG. 1A is started is set to 0; the welding toe 41 and the shape change start point 51 match each other; and an R-shape continuous to the weld portion 40' and the wall surface member 30B is formed by machining. In this case, two shape displacement points are formed on a weld portion 40B having an R-shaped exposed surface 42B after machining and on a stepped portion 50B having an R-shape after machining. Note that a continuous tapered surface may be formed instead of the R-shape continuous to the weld portion 40B and the wall surface member 30B.

Figure 7A:
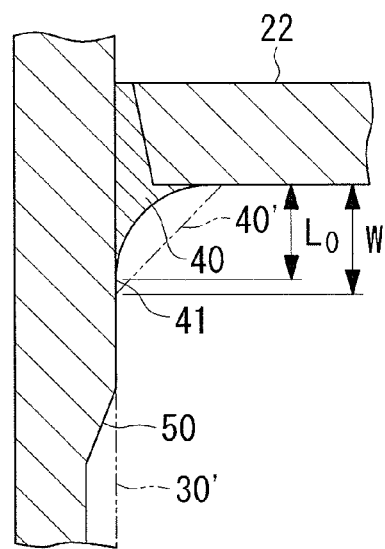
FIG. 7A is a sectional view illustrating a fourth modified example of the weld structure portion illustrated in FIG. 1A.
Figure 7B:
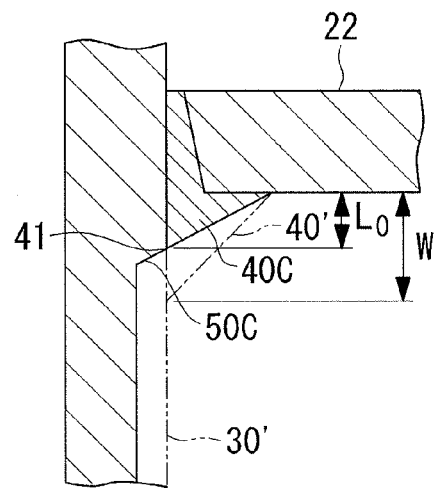
FIG. 7B is a sectional view illustrating a fifth modified example of the weld structure portion illustrated in FIG. 1A.
Figure 7C:
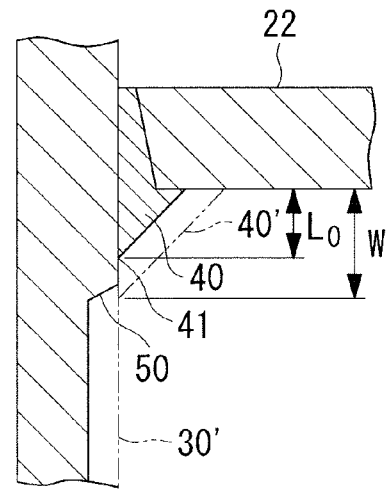
FIG. 7C is a sectional view illustrating a sixth modified example of the weld structure portion illustrated in FIG. 1A.

The modified examples of the weld structure portions illustrated in FIGS. 7A to 7C illustrate specific examples of changes in shape by machining. Note that each imaginary lines illustrated in the figures indicates the shape obtained before machining.

In a fourth modified example illustrated in FIG. 7A, machining is performed from the weld portion 40' and a wall surface member 30' after welding as indicated by the imaginary line in the figure, thereby forming two shape displacement points of the weld portion 40A having an R-shape and the stepped portion 50 having a tapered surface. In this case, the distance $L_0$ from the lower surface of the bolster plate 22 to the welding toe 41 is smaller than the welding leg length W ($L_0 < W$).

In a fifth modified example illustrated in FIG. 7B, machining is performed from the weld portion 40' and the wall surface member 30' after welding indicated by the imaginary line in the figure, two shape displacement points of a weld portion 40C having a continuous tapered surface and a stepped portion 50C are formed. In this case, the distance $L_0$ from the lower surface of the bolster plate 22 to the welding toe 41 is smaller than the welding leg length W ($L_0 < W$).

In a sixth modified example illustrated in FIG. 7C, machining is performed from the weld portion 40' and the wall surface member 30' after welding indicated by the imaginary line in the figure, thereby forming two shape displacement points of the weld portion 40 having a tapered surface and the stepped portion 50 having a tapered surface. In this case, the distance $L_0$ from the lower surface of the bolster plate 22 to the welding toe 41 is smaller than the welding leg length W ($L_0 < W$).

Figure 8:
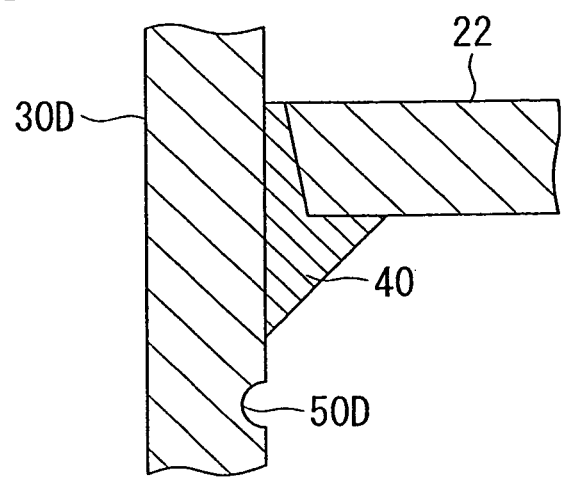
FIG. 8 is a sectional view illustrating a seventh modified example of the weld structure portion illustrated in FIG. 1A.

In a seventh modified example illustrated in FIG. 8, a stepped portion 50D having a recessed groove with a substantially semi-circular sectional surface is formed as a shape displacement point. In this case, the stepped portion 50D may be combined with the weld portion 40 having a tapered surface, or may be combined with the weld portion 40A having an R-shape.

In the embodiment described above, the weld portion has two shape displacement points in total including one stepped portion. However, the number of stepped portions is not limited to one, but two or more stepped portions may be formed. In this case, the weld portion may have a tapered surface or an R-shape. Further, as one or more stepped portions to be combined with this, one or various kinds selected from a tapered surface, an R-shape, and a recessed groove having a substantially semi-circular sectional surface can be employed.

Furthermore, the above-mentioned weld structure portion described above is not limited to the bolster plate 22 of the tire machinery 10 described above. For example, the weld structure portion can be applied not only to the bottom plate of the lower dome 12 to be attached within the pressure vessel of the tire machinery 10, but also to various plates to be attached within other pressure vessels.

Note that the present invention is not limited to the embodiment described above, but can be modified as needed without departing from the gist of the invention.

REFERENCE SIGNS LIST

10 Tire Machinery
11 Upper Dome
12 Lower Dome
13 Clamp Ring
14 Cylinder
15 Green Tire
16 Mold
22 Bolster Plate
30, 30A, 30B, 30D, 30' Wall Surface Member
40, 40A-40C, 40' Weld Portion
50, 50A-50D Stepped Portion

The invention claimed is:
1. A pressure vessel, comprising:
a container body,
a plate member that is attached so as to partition an inside of the container body and that receives a pressure or a load, and a weld portion in which an end of the plate member is attached by welding to a wall surface member of the container body, wherein the plate member and the wall surface member form a weld structure portion, wherein the weld structure portion has at least a first shape displacement point and a second shape displacement point having a predetermined space therebetween, the first shape displacement point and the second shape displacement point being provided on the inside of the container body, wherein the wall surface member has a plate thickness t between a welding toe and a shape change start point at which the second shape displacement point is started, wherein the second shape displacement point is formed by reducing the plate thickness t of the wall surface member by a thickness d by machining, wherein the first shape displacement point is formed over a distance $L_0$ from a lower surface of the plate member to the welding toe in the weld structure portion obtained after machining, wherein a distance from the welding toe to the shape change start point at which the second shape displacement point is started in the weld structure portion obtained after machining is $L_1$, wherein the second shape displacement point is formed over a distance $L_2$ from the shape change start point to a shape change end point in the weld structure portion obtained after machining, and wherein a welding leg length which is obtained in the weld structure portion after welding and before machining and which is a distance from the lower surface of the plate member to a welding toe before machining is defined to be W, $L_0$, $L_1$, $L_2$, and d satisfies $0<L_0<W$, $0<L_1<5L_0$, $0<L_2<9L_0-L_1$, and $0<d<0.8t$.

2. A tire machinery, comprising:
the pressure vessel according to claim 1,
wherein an upper dome and a lower dome are detachably-attachably connected to each other to define the pressure vessel.

3. The pressure vessel according to claim 1, wherein the welding toe is an end part of the weld portion.

4. The pressure vessel according to claim 1, wherein the shape change end point is a point where the second shape displacement point is ended.

* * * * *